Sept. 16, 1941.    C. HANSEN    2,256,248

LOCK FOR TELESCOPIC STEMS

Filed June 27, 1940

Christen Hansen
INVENTOR

BY Harry Lea Wodson
ATTORNEY

Patented Sept. 16, 1941

2,256,248

UNITED STATES PATENT OFFICE 2,256,248

LOCK FOR TELESCOPIC STEMS

Christen Hansen, Decatur, Ill., assignor to Faries Manufacturing Company, Decatur, Ill., a corporation of Illinois Application June 27, 1940, Serial No. 342,739

2 Claims. (Cl. 287—58)

My invention relates to that class of devices described in United States Letters Patent No. 2,170,679, issued to Bert A. Dickerson, on the 22nd day of August, 1939. As described in that patent, the device comprises a pair of telescoping tubes, the center of which is provided with a bushing which has a bevelled surface and a pin projecting from this surface. A collar is slidably mounted on the inner tube having a downward depending peripheral flange, the inner surface of which is adapted to contact the pin when the collar is permitted to slide downwardly on the inner tube. This causes the collar to tip and engage the inner tube and lock it securely against further inward movement.

My invention has for its principal object to construct a device which will accomplish the same result but without the necessity of forming a beveled surface on the bushing or providing a pin on said beveled surface.

A further object is to construct a lock for telescoping stems with convenient means for manual manipulation.

A further object is to attain the foregoing objects with a minimum of expense.

My means of accomplishing the foregoing objects may be more fully comprehended by having reference to the accompanying drawing, which is hereunto annexed and is a part of this specification, in which.

Similar reference numerals refer to similar parts throughout the entire specification.

Figure 1:
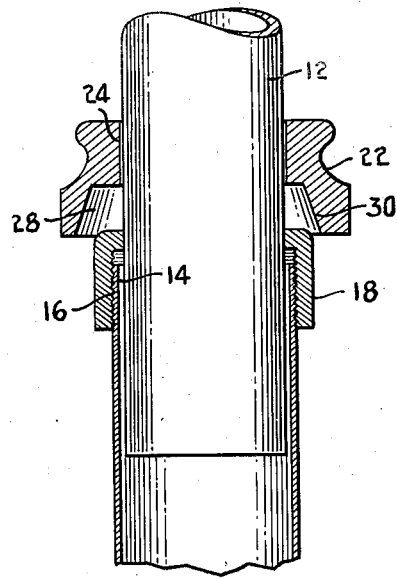
Fig. 1 is a vertical sectional view, the inner tube being shown in elevation.
Figure 2:
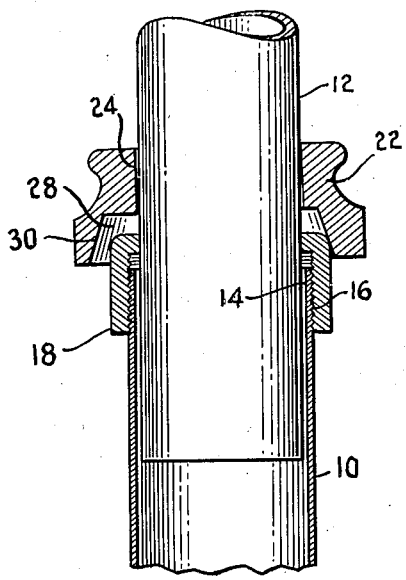
Fig. 2 is a similar view with the inner tube locked.
Figure 3:
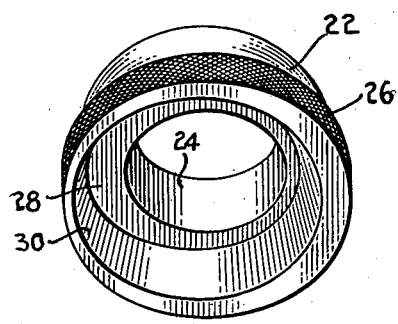
Fig. 3 is a perspective view of my improved locking collar.
Figure 4:
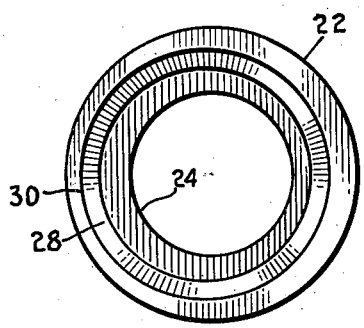
Fig. 4 is an end view of the same.

As shown in the drawing, the device comprises a pair of telescopic tubes 10 and 12. On the upper end 14 of the outer tube 10 I cut a series of threads 16. On these threads 16 I mount a cap or bushing 18 which is provided with internal threads 20 which fit the threads 16 on the upper end 14 of the outer tube 10.

While I have described this member as a bushing or cap, I am only describing a preferred construction for it may be found convenient to upset the end of the tube to form a shoulder which would obviously serve the same purpose. On the inner tube 12, I mount a collar 22 which is provided with a through opening 24 of slightly larger diameter than the inner tube 10.

A knurled surface 26 is provided on the periphery of the collar 22 for the convenient manipulation of the collar 22 on the inner tube 12. In the lower face of the collar 22 I form a recess 28, the walls 30 of which are eccentric to the through opening 24. Preferably the walls 30 are tapered inwardly, as clearly seen in the drawing. The opening of the recess 28 in the face of the collar 22 should be of sufficient size so that the bushing 18 can enter the recess 28 freely as seen in Fig. 1 of the drawing, even on the eccentric side of the recess.

The operation of the device is as follows: the operator grasps the inner tube 12 and lifts it to the height desired, this movement being perfectly free. Upon releasing the tube 12, gravity will cause the collar 22 to drop and abut the bushing 18 on that part of the eccentric wall which is closest to it, this causes the collar 22 to tip and the edges 32 and 34 of the through opening will engage the walls of the inner tube 12 and effectually prevent its sliding into the outer tube 10.

On the other hand, if it is desired to lower the inner tube 12, all that is required is to grasp the knurled surface of the collar 22 and lift the collar 22 out of engagement with the bushing 18, when the inner tube 12 may be easily slid the desired distance into the outer tube 10. When the collar 22 is released, it will drop onto the bushing 18 and instantly lock the tube 12 against further inward movement.

Having described my invention what I regard as new and desire to secure by Letters Patent is:

1. A pair of telescoping tubes, a collar loosely mounted on the inner tube and concentric therewith, an annular recess in said collar, the walls of which taper inwardly, the tapered walls of said recess being eccentric to the opening through said collar, a threaded bushing on upper end of the outer tube, adapted to abut the wall of said recess, and thereby cocked to lock said inner tube from sliding into said outer tube, and means on said collar for convenient manual manipulation.

2. In a device of the character described, a pair of telescoping tubes, a bushing on the upper end of the outer tube and concentric therewith, a collar loosely mounted on the inner tube, a recess in said collar eccentric to its through opening, whereby on contact of the wall of said recess with the outer surface of said bushing, said collar will be cocked so that it will lock the inner tube from movement in one direction while permitting free movement in the other.

CHRISTEN HANSEN.